United States Patent
Collins

(10) Patent No.: US 6,843,813 B1
(45) Date of Patent: Jan. 18, 2005

(54) REJUVENATION AND/OR CLEANING OF CATALYSTS

(76) Inventor: Hugh Frederick Collins, 12 Beach Lawn, Waterloo Liverpool L22 8QA (GB)

( * ) Notice: Subject to any disclaimer, the term of this patent is extended or adjusted under 35 U.S.C. 154(b) by 278 days.

(21) Appl. No.: 09/589,579

(22) Filed: Jun. 7, 2000

(51) Int. Cl.$^7$ .................................................. C10L 1/18
(52) U.S. Cl. ............................. 44/438; 44/439; 44/640; 134/20; 137/15.05
(58) Field of Search .................... 44/438, 439, 340, 44/444, 640; 134/20, 29; 137/15.05

(56) References Cited

U.S. PATENT DOCUMENTS

| | | | | |
|---|---|---|---|---|
| 3,869,262 A | * | 3/1975 | Mayerhoffer et al. ..... | 301/37.25 |
| 4,147,136 A | | 4/1979 | Noguchi et al. ............... | 123/3 |
| 4,261,702 A | * | 4/1981 | Sweeney et al. .............. | 44/402 |
| 4,265,638 A | | 5/1981 | Burke ........................... | 44/56 |
| 4,390,344 A | * | 6/1983 | Sweeney ..................... | 252/407 |
| 4,395,267 A | * | 7/1983 | Sweeney ..................... | 44/444 |
| 4,397,655 A | * | 8/1983 | Sweeney ..................... | 44/308 |
| 4,748,289 A | | 5/1988 | Douglas ....................... | 585/14 |
| 5,141,524 A | | 8/1992 | Gonzalez ..................... | 44/340 |
| 5,266,082 A | | 11/1993 | Sanders ....................... | 44/357 |
| 5,314,851 A | | 5/1994 | Huba ........................... | 502/22 |
| 5,316,558 A | * | 5/1994 | Gonzalez ..................... | 44/340 |
| 5,419,121 A | | 5/1995 | Sung et al. ................... | 60/274 |
| 5,688,295 A | | 11/1997 | Yang ............................ | 44/320 |
| 6,013,114 A | * | 1/2000 | Hille et al. .................... | 44/308 |
| 6,113,661 A | * | 9/2000 | Germanaud et al. .......... | 44/349 |
| 6,123,742 A | * | 9/2000 | Smith .......................... | 44/438 |

FOREIGN PATENT DOCUMENTS

| | | | |
|---|---|---|---|
| EP | 0070619 | * | 1/1983 |
| EP | 0 166 006 A1 | | 1/1986 |
| EP | 0178792 | * | 4/1986 |
| EP | 0 405 310 A | | 1/1991 |
| FR | 2 493 863 | | 5/1982 |
| GB | 2328626 | * | 11/1997 |
| GB | 2 333 048 A | | 7/1999 |
| WO | WO 97/41336 | | 11/1997 |
| WO | WO 01/94013 | | 12/2001 |

* cited by examiner

*Primary Examiner*—Cephia D. Toomer
(74) *Attorney, Agent, or Firm*—Woodcock Washburn LLP

(57) ABSTRACT

Compositions and methods are provided for cleaning and/or rejuvenating catalysts, including catalysts of the type used in vehicle catalytic converters. The compositions of the invention comprise a hydrocarbon source and an oxygen donor, which may be one and the same compound. The composition may be combustible, and the composition may generate organic acid vapor upon combustion. The composition may also include a number of trace metals. Methods according to the invention include the steps of bringing the catalyst up to working temperature and passing the rejuvenating and/or cleansing composition or the combustion products of the rejuvenating and/or cleansing composition over the catalyst.

7 Claims, No Drawings

REJUVENATION AND/OR CLEANING OF CATALYSTS

BACKGROUND OF THE INVENTION

1. Field of the Invention

The present invention relates to a rejuvenating and/or cleaning agent, particularly to a rejuvenating and/or cleaning agent for a catalyst of the type used in a vehicle catalytic converter, and to a method of rejuvenating and/or cleaning the catalyst of a catalytic converter.

2. Brief Description of the Prior Art

Catalytic converters are now fitted to most internal combustion engine vehicles, in order to reduce the levels of undesirable components in exhaust emissions. In particular, exhaust emissions of carbon monoxide (CO), unburnt fuel hydrocarbon (HC) and nitrogen oxides ($NO_x$) are regulated by law.

A catalytic converter usually comprises a noble metal catalyst, for example of platinum, palladium and/or rhodium, which converts undesirable unburnt hydrocarbons (HC) and carbon monoxide (CO) to carbon dioxide and water, and nitrogen oxides ($NO_x$) to nitrogen and water. Typically, a catalytic converter consists of a cordierite ceramic monolith extruded to form a honeycomb-like structure of cells having a large surface area. The cell walls are coated with the metal catalyst, such that the engine exhaust gases contact the catalyst surface prior to their emission into the atmosphere. Alternatively, the noble metal catalyst may be dispersed on a high surface area carrier in the form of alumina pellets.

A major problem with catalytic converters is that the catalyst is easily poisoned and/or rendered less effective, for example by a build up of carbonaceous deposits, or by the accumulation of certain elements such as lead or phosphorus on the surface of the catalyst.

A number of processes have been employed for restoring the activity of the catalyst. Most, however, require the catalyst to be removed from the vehicle. One such method is described in European Patent Application EP 0178792 A, which discloses a method of regenerating a phosphorus-poisoned exhaust catalyst by washing or soaking the catalyst in and acid solution and then heating the wetted catalyst in air.

There have also been attempts to overcome the problem of catalyst poisoning without removing the catalyst from the vehicle. For example, European Patent Application EP 0070619 A describes a method of regenerating a catalyzed particulate filter by occasionally supplying an amount of unburnt fuel to the filter in order to ignite particulates deposited in the filter. PCT Application WO 97/41336 and British Application GB 2328626 describe an apparatus and a method for regenerating a diesel engine $NO_x$ catalyst which has been contaminated with $SO_x$, by adding a predetermined quantity of a reductant diesel fuel to the exhaust pipe via a special nozzle.

U.S. Pat. No. 5,316,558 to Gonzalez discloses a petroleum-derived fuel composition of improved efficiency which reduces the tendency of the fuel to create deposits, thus reducing exhaust emissions. There is no suggestion, however, that the disclosed compositions might serve to regenerate a catalyst which has already been poisoned or affected by contaminants.

SUMMARY OF THE INVENTION

It is an object of the present invention to address at least some of the problems of catalyst deactivation by providing an improved composition for cleaning and/or rejuvenating a catalyst of the type found in a catalytic converter without having to remove the catalyst from the vehicle.

It is a further object of the present invention to provide an improved method of cleaning and/or rejuvenating a catalyst of the type found in a catalytic converter without having to remove the catalyst from the vehicle.

According to the present invention, the above-mentioned objects are achieved by passing a cleaning composition in situ into the vehicle engine whilst running the engine, the catalytic converter having first been brought up to working temperature.

According to a first aspect of the invention, there is provided a rejuvenating and/or cleaning composition for a catalyst of a vehicle catalytic converter, comprising at least one hydrocarbon source and at least one oxygen donor.

In some cases the oxygen donor or one of the oxygen donors and the hydrocarbon source or one of the hydrocarbon sources can be one and the same compound.

Preferably the composition is combustible. Preferably, the composition generates an organic acid vapour on combustion. More preferably, the organic acid vapour includes a carboxylic acid vapour.

Preferred compositions include one or more organic solvents as hydrocarbon source and/or oxygen donor. Examples of preferred organic solvents include: aliphatic alcohols, e.g. isopropyl alcohol; ketones, e.g. acetone; aromatic hydrocarbons, e.g. xylene; and aliphatic hydrocarbons, e.g. alkanes, paraffin (kerosene) and lamp oil. Clearly not all of the compounds are oxygen donors and the composition should include at least one oxygen donor.

More preferably, the composition comprises one or more organic solvents selected from: is opropyl alcohol, acetone, xylene and paraffin. The first two of these components are both oxygen donors and hydrocarbons. Preferably the composition comprises all four of these ingredients.

Preferably the components of this mixture are present in the following amounts (by weight %)

|  | Preferred | More Preferred | Most Preferred |
| --- | --- | --- | --- |
| isopropyl alcohol | 10–40% | 15–25% | 20% |
| acetone | 10–40% | 15–25% | 20% |
| xylene | 35–65% | 45–55% | 50% |
| paraffin | 5–15% | 7–12% | 10% |

The composition also preferably comprises one or more, and more preferably all of, the following trace elements: Sr, Bi, Cd, Ba, Ni, Mn, Fe, Na, Zn, Al, Ca, Cu, Pb, Co, K, Cr, Mg, As, Sn, Sb, V, Ti, Be, Si, P, W, and Mo.

Yet more preferably, the trace elements are each present in an amount of t30% of the following figures shown for the respective element: Sr (0.01 ppm), Bi (0.05 ppm), Cd (0.01 ppm), Ba (0.01 ppm), Ni (0.07 ppm), Mn (0.05 ppm), Fe (0.16 ppm), Na (4.03 ppm), Zn (0.05 ppm), Al (0.19 ppm), Ca (0.14 ppm), Cu (0.02 ppm), Pb (0.06 ppm), Co (0.01 ppm), K (15.59 ppm) Cr (0.01 ppm), Mg (0.05 ppm), As (0.05 ppm), Sn (0.34 ppm), Sb (0.10 ppm), V (0.07 ppm), Ti (0.01 ppm), Be (0.01 ppm), Si (0.39 ppm), P (0.17 ppm), W (0.14 ppm), and Mo (0.01 ppm).

Without wishing to be bound by theory it is believed that the composition functions because on combustion it produces (i) oxygen which helps oxidise any carbonaceous layer present on the catalyst surface and which inhibits the function of the catalyst, and/or (ii) an organic acid (e.g. carboxylic acid) vapour which aids in cleaning the surface of the catalyst.

Although the invention is mainly for use with vehicles which run on unleaded fuel, at least some of the compositions work with contamination caused by leaded fuels. For example lead contaminant has been removed from a catalyst in a catalytic converter using a composition of the invention.

According to a second aspect of the invention, there is provided a method of rejuvenating and/or cleaning a catalyst of a vehicle catalytic converter without removal of the catalyst from the vehicle, said method comprising the steps of:

(i) bringing the catalytic converter up to working temperature;

(ii) passing the rejuvenating and/or cleaning composition into an engine of the vehicle whilst running the engine.

In a preferred embodiment of this aspect of the invention, wherein the vehicle has an engine and a fuel line, the method further comprises the steps of:

(i) bringing the engine of the vehicle to working temperature;

(ii) disconnecting the fuel line of the vehicle from the engine;

(iii) connecting the engine to a means for feeding a rejuvenating and/or cleaning composition thereto; and (iv) feeding the cleaning composition into the engine whilst running the engine to effect cleaning of the catalyst.

In the above-described preferred embodiment, the rejuvenating and/or cleaning is thus carried out in situ, but whilst the engine fuel supply is disconnected from the engine, the engine being independently run on the composition.

Preferably the cleaning composition is fed into the injection system, through the combustion engine, through the catalytic converter and out through the exhaust system into the atmosphere.

According to a third aspect of the invention, there is provided a method of rejuvenating and/or cleaning a catalyst of a vehicle catalytic converter without removal of the catalyst from the vehicle, the vehicle having an engine and a fuel tank, said method comprising the steps of:

(i) introducing the cleaning composition into the fuel tank, said tank already containing a quantity of fuel; and then (ii) running the engine of the vehicle to effect cleaning of the catalyst.

Preferably, according to the third aspect of the invention, the amount of composition added is predetermined by the quantity of fuel contained in the tank, the amount of composition being in the range of 0.5 to 0.75 liters per 30 liters of fuel.

Preferably, according to the second or the third aspect of the invention, the engine is run at a temperature of from 60 to 90° C., more preferably at or about the vehicle manufacturer's recommended operating temperature.

DESCRIPTION OF PREFERRED EMBODIMENTS

The invention will be described, by way of example only, by reference to the following examples and test data.

Example 1

An engine of a 1991 Nissan 300 ZX with 72,000 miles on the clock, and having a catalytic converter which had become poisoned, was run until the engine, and more importantly the exhaust system, reached normal operating temperature (approximately 80° C.) The fuel lines feeding the engine were then disconnected and in place of the fuel lines the engine was connected to an injection system purge machine and 1 liter of a rejuvenating and/or cleaning composition containing the following:

| | |
|---|---|
| isopropyl alcohol | 20% |
| acetone | 20% |
| xylene | 50% |
| paraffin | 10% | and the trace elements as listed previously approximately in the amounts stated, was introduced under pressure into the engine. The machine circulated the composition (which is a liquid at room temperature) under pressure via the fuel injection system. The rejuvenating and/or cleaning composition burned in the engine and the combustion gases and any unburnt fluid travelled over the catalyst of the catalytic converter.

In tests (analysis was by a calibrated four gas analyzer) the composition of example 1 was found to have a significant effect on tail pipe emissions as illustrated in Table 1.

Example 1

TABLE 1

| | Before* | After |
|---|---|---|
| CO % | 2.71 | 0.02 |
| HC ppm | 263 | 30 |

Example 2

Example 1 was repeated with a 1992 Vauxhall Astra with 80,000 miles on the clock. The results are set out in Table 2 below which indicates significant effect, on tail pipe emissions, of the rejuvenation and/or cleaning.

TABLE 2

| | Before* | After |
|---|---|---|
| CO % | 1.45 | 0.02 |
| HC ppm | 110 | 8 |

Example 3

Example 1 was repeated with a 1996 Renault Megane with 12,000 miles on the clock. The results are set out in Table 3 below which indicates significant effect, on tail pipe emissions, of the rejuvenation and/or cleaning.

TABLE 3

| | Before* | After |
|---|---|---|
| CO % | 0.00 | 0.01 |
| HC ppm | 72 | 27 |

*"Before" means—Before rejuvenating and/or cleaning with the composition of the invention.

Example 4

Example 1 was repeated with a Peugeot 605. The results are set out in Table 4 below which indicates significant effect, on tail pipe-emissions, of the rejuvenation and/or cleaning.

Example 5

Example 1 was repeated with a Ford Fiesta. The results are set out in Table 5 below which indicates significant effect, on tail pipe emissions, of the rejuvenation and/or cleaning.

TABLE 4

|  | CO | $CO_2$ | HC | $O_2$ |
|---|---|---|---|---|
| Starting value | 0.0072% | 7.1% | 36 ppm | 10.0% |
| after treatment | 0.002% | 13.6% | 2 ppm | 7.6% |

TABLE 5

|  | CO | $CO_2$ | HC | $O_2$ |
|---|---|---|---|---|
| Starting value | 0.367% | 15.3% | 116 ppm | 2.5% |
| after treatment | 0.023% | 15.6% | 49 ppm | 2.2% |
| follow up | 0.030% | 15.9% | 63 ppm | 2.0% |
| follow up | 0.008% | 15.3% | 23 ppm | 5.2% |
| follow up | 0.081% |  | 47 ppm |  |

The "follow up" measurements were carried out at approximately 1000 mile intervals.

These examples indicate that the catalyst is operating more effectively after treatment, indicating the catalyst has been rejuvenated and/or cleaned.

Example 6

Two types of emissions tests were performed on a 1994 model Renault Twingo having a gasoline engine, which had an odometer reading of 129050. The tests were carried out both before and after the following in-tank treatment: 0.5 liter of a rejuvenating and/or cleaning composition identical to that used in Example 1, was added to the vehicle's fuel tank, which fuel tank contained approximately 15 liters of gasoline fuel. The vehicle engine was then actuated in the normal way, by spark ignition, thereby allowing the mixture of fuel and cleaning composition to pass into the engine's injection system and to combust in the cylinder chambers, the unburnt fuel and gases passing through the catalytic converter. The vehicle was driven for a distance of 30 miles at a speed of 50 miles per hour.

Prior to treatment according to the invention, the vehicle was driven on a Clayton chassis dynamometer system DC500, while following the driving schedules of the US Federal test. All exhaust gas sampling was carried out on diluted exhaust gases in a dilution tunnel, which was designed to fulfil the Code of Federal Regulations.[1] The flow of diluted exhaust was 6 $m^3$/min, maintained by a venturi, and the average dilution ratio was approximately 10.5. According to the test, three gaseous transients were sampled. A first "cold start" transient ($Y_{ct}$) corresponded to emissions produced upon starting the vehicle from a "cold" state, wherein the vehicle engine had not been used in the prior period of 8 to 12 hours. A second, "mid-range" transient ($Y_s$) corresponded to the emissions expelled at normal working temperature in the drive cycle, while a third transient ($Y_{ht}$) was sampled upon starting the engine after a 10 minute period during which the engine was at rest.

Measurements of regulated emissions were carried out in accordance with the test procedure described in the literature[2] using a Horiba 9000 system. The following emissions were measured as follows: carbon monoxide (CO) with a nondispersive infrared analyser (NDIR), total unburnt hydrocarbons (HC) with a flame ionization detector (FID), and oxides of nitrogen ($NO_x$) with a chemiluminescence analser (CLA).

After completion of the treatment, exhaust emissions were again measured using the dynamometer test already described above. The results obtained before and after treatment, for the $Y_s$ and $Y_{ht}$ transients are shown in Table 6. Cold start ($Y_{ct}$) measurements were not considered to be of significance, since the temperature in the catalytic converter had not yet reached a sufficient temperature to become effective.

TABLE 6

|  | $Y_s$ transient | | $Y_{ht}$ transient | |
|---|---|---|---|---|
|  | Before | After | Before | After |
| CO/ppm | 21.5 | 15.7 | 222.7 | 144.4 |
| HC/ppm | 3.49 | 3.19 | 24.12 | 22.89 |
| $NO_x$/ppm | 0.34 | 3.19 | 2.43 | 3.94 |

The mediate results in Table 6 show that the CO emissions are reduced by 27–35% in the hot transients, $Y_s$ and $Y_{ht}$, after treatment with the additive. HC emissions were also reduced significantly.

Static tests were also performed on the vehicle both before and after the treatment. The test was in accordance with the UK MOT procedure, using an Opus 40 Exhaust Gas Analyser, manufactured by Prodox AB and complying with ECE regulations. The engine was run at idling and at 2500 rpm. CO, HC, $CO_2$ and $O_2$ values were measured. Before the second test, i.e. post treatment, the vehicle was conditioned with approximately 50 km of driving with the additive in the fuel. All MOT tests were carried out with hot engines. Results from these tests are shown in Table 7.

TABLE 7

|  | Idling | | at 2500 rpm | |
|---|---|---|---|---|
|  | Before | After | Before | After |
| CO, % | 0.05 | 0.00 | 2.9 | 0.03 |
| HC/ppm | 123 | 38 | 226 | 24 |
| $CO_2$, % | 13.9 | 14.6 | 12.9 | 15.1 |
| $O_2$, % | 1.65 | 0.85 | 0.21 | 0.22 |
| Lambda | 1.06 | 1.04 | 0.91 | 1.01 |

From the results in Table 7 it can be seen that the Renault Twingo after the treatment emitted 70% less HC on idling and 90% less HC at 2500 rpm. The CO emissions were reduced from 0.05% at idling and 2.9% at 2500 rpm to levels below the detection limit.

Example 7

In-tank treatment was performed on a diesel-powered 1991 model Volvo 940 which had an odometer reading of 335002 km. Addition of a rejuvenating and/or cleaning composition to the fuel tank, which contained approximately 15 of diesel fuel, was carried out exactly as described in Example 6. The vehicle was driven for a distance of 30 miles at a speed of 50 miles per hour.

The vehicle engine was then actuated in the normal way, by compression ignition, thereby allowing the mixture of fuel and cleaning composition to pass into the engine's injection system and to combust in the cylinder chambers, the unburnt fuel and gases passing through the catalytic converter.

A chassis dynamometer test, exactly as described in Example 6, was carried out before and after treatment. Swedish environmental class 1 (MK1) fuel, from AB Svenska Shell, was used. Particulate emissions were measured using a filter pad which was weighed before and after the test. The results are shown in Table 8.

TABLE 8

|  | $Y_{ct}$ transient | | $Y_s$ transient | | $Y_{ht}$ transient | |
| --- | --- | --- | --- | --- | --- | --- |
|  | Before | After | Before | After | Before | After |
| CO/ppm | 37.1 | 31.6 | 33.3 | 33.7 | 26.2 | 26.3 |
| $C_3H_8$/ppm | 8.16 | 6.67 | 4.77 | 4.70 | 6.79 | 5.36 |
| $NO_x$/ppm | 35.91 | 38.33 | 27.92 | 27.62 | 36.86 | 34.87 |
| Particulates/g/km | 0.233 | 0.205 | 0.117 | 0.104 | 0.177 | 0.138 |

The results show that the particulate emissions during the transient tests were reduced by 11–22% after treatment with the additive. Other regulated components were not significantly altered. However, CO and HC emissions were reduced by 15% and 18% respectively during the cold start phase ($Y_{ct}$).

Static opacity tests were also performed on the vehicle both before and after the treatment. The results of these tests are significant as they indicate the amount of particulates emitted form a diesel engine in to the air via the exhaust tile pipe. The test system used was a Bosch EAM 3.011 that complied with ECE R24 regulation. This allows measuring capacity at optional points of time and at free acceleration. The light-absorption coefficient k was calculated for every acceleration using the formula $$K=-1/L.ln(1-N/100)$$

where N is the opacity and L is the effective length of the measurement probe. The maximum k was noted for every acceleration. The average k over the time from throttle opening to close at the accelerations was calculated as well as the integrated k over the same time. The first of the four free accelerations was omitted. The limit value the MOT test was 3 $m^1$.

The results of the opacity tests showed a 60% reduction in emissions from 2.51 $m^{-1}$ to 1.04 $m^{-1}$.

The above results demonstrate the efficacy of compositions according to the invention as agents for the rejuvenation and/or cleaning of catalysts in catalytic converters. The above-described compositions, when used according to the above-described methods, are shown to be effective in the rejuvenation and/or cleaning of catalysts in catalytic converters of both gasoline and diesel-burning vehicles. Further experiments were carried out in which the composition of the agent was varied, and, for the "in-tank" method of Examples 6 and 7, in which the ratio of composition added to the amount of fuel in the tank was varied. These compositions and methods gave similar results to those of the above Examples, though in most cases either a longer treatment time was required, or a less pronounced reduction in emissions resulted. Possible substitutes for the constituents are as follows:

| Original component | Substitute |
| --- | --- |
| xylene | toluene, benzene |
| acetone | Methyl ethyl ketone, cyclohexane, acetone, alcohol |
| isopropyl alcohol | ethanol |
| kerosene | distillate white spirit |

The above Examples are merely illustrative and non-limiting in scope, serving to indicate preferred embodiments of the invention only. It should be understood that variants of the invention are envisaged without departing from the scope of the claimed invention.

I claim:

1. A rejuvenating or cleaning composition for a catalyst of a vehicle catalytic converter comprising 10–40 wt % isopropyl alcohol, 10–40 wt % acetone, 35–65 wt % xylene and 5–15 wt % paraffin, and one or more of the elements Sr, Bi, Cd, Ba, Ni, Mn, Fe, Na, Zn, Al, Ca, Cu, Pb, Co, K, Cr, Mg, As, Sn, Sb, V, Ti, Be, Si, P, W, and Mo.

2. The rejuvenating or cleaning composition as claimed in claim 1, wherein those elements which are present are each present in an amount of ±30% of the figures shown for the respective element: Sr (0.01 ppm), Bi (0.05 ppm), Cd (0.01 ppm), Ba (0.01 ppm), Ni (0.07 ppm), Mn (0.05 ppm), Fe (0.16 ppm), Na (4.03 ppm), Zn (0.05 ppm), Al (0.19 ppm), Ca (0.14 ppm), Cu (0.02 ppm), Pb (0.06 ppm), Co (0.01 ppm), K (15.59 ppm) Cr (0.01 ppm), Mg (0.05 ppm), As (0.05 ppm), Sn (0.34 ppm), Sb (0.10 ppm), V (0.07 ppm), Ti (0.01 ppm), Be (0.01 ppm), Si (0.39 ppm), P (0.17 ppm), W (0.14 ppm), and Mo (0.01 ppm).

3. A method of rejuvenating or cleaning a catalyst in a vehicle catalytic converter without removal of the catalyst from the vehicle, said method comprising:

(i) bringing an engine of the vehicle and the catalytic converter up to working temperature;

(ii) disconnecting the vehicle's fuel line from the engine;

(iii) connecting the engine to source of rejuvenating or cleaning composition; and (iv) feeding the composition into the engine while the engine is running at idle at a temperature high enough to effect cleaning of the catalyst.

4. A method as claimed in claim 3, wherein the vehicle is run at a temperature of between 60 and 90 C.

5. A method as claimed in claim 3, wherein the rejuvenating or cleaning composition comprises 10–40 wt % isopropyl alcohol, 10–40 wt % acetone, 35–65 wt % xylene and 5–15 wt % paraffin, and one or more of the elements Sr, Bi, Cd, Ba, Ni, Mn, Fe, Na, Zn, Al, Ca, Cu, Pb, Co, K, Cr, Mg, As, Sn, Sb, V, Ti, Be, Si, P, W, and Mo.

6. A method as claimed in claim 5, wherein the rejuvenating or cleaning composition is combustible.

7. A method as claimed in claim 5, wherein the rejuvenating or cleaning composition is fed into an injection system, through the engine, through the catalytic converter and out through an exhaust system into the atmosphere.

* * * * *